United States Patent
Lee et al.

(10) Patent No.: US 11,538,450 B2
(45) Date of Patent: Dec. 27, 2022

(54) APPARATUS FOR IMPROVING SOUND OF VEHICLE

(71) Applicant: LG ELECTRONICS INC., Seoul (KR)

(72) Inventors: Kyuho Lee, Seoul (KR); Kihyun Kim, Seoul (KR); Byounggi Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 41 days.

(21) Appl. No.: 17/296,087

(22) PCT Filed: Nov. 13, 2019

(86) PCT No.: PCT/KR2019/015446
§ 371 (c)(1),
(2) Date: May 21, 2021

(87) PCT Pub. No.: WO2020/105947
PCT Pub. Date: May 28, 2020

(65) Prior Publication Data
US 2022/0013099 A1    Jan. 13, 2022

(30) Foreign Application Priority Data
Nov. 21, 2018   (KR) .................. 10-2018-0144100

(51) Int. Cl.
*G10K 11/16*    (2006.01)
*B60W 40/105*    (2012.01)

(52) U.S. Cl.
CPC .......... *G10K 11/16* (2013.01); *B60W 40/105* (2013.01); *B60W 2420/54* (2013.01);
(Continued)

(58) Field of Classification Search
CPC .......... G10K 11/16; G10K 2210/1282; G10K 2210/3028; G10K 11/17883;
(Continued)

(56) References Cited

U.S. PATENT DOCUMENTS

| 2007/0019825 A1* | 1/2007 | Marumoto | ............... H04R 5/02 381/94.1 |
| 2016/0071508 A1 | 3/2016 | Wurm et al. | |
| 2017/0178617 A1 | 6/2017 | Christoph et al. | |

FOREIGN PATENT DOCUMENTS

| JP | 2001075595 | 3/2001 |
| KR | 20120062527 | 6/2012 |

(Continued)

OTHER PUBLICATIONS

PCT International Application No. PCT/KR2019/015446, International Search Report dated Feb. 20, 2020, 4 pages.

*Primary Examiner* — Norman Yu
(74) *Attorney, Agent, or Firm* — Lee, Hong, Degerman, Kang & Waimey PC

(57) ABSTRACT

An apparatus for improving the sound of a vehicle according to one embodiment of the present invention, may comprise: a window open/closed detection sensor for detecting the open/closed state of a window of the vehicle; a car door open/closed detection sensor for detecting the open/closed state of a car door of the vehicle; a speed sensor for measuring the speed of the vehicle; a microphone; a memory; and a processor for adjusting a coefficient of an adaptive filter used for an engine order cancellation (EOC) function, on the basis of the opened degree of the window and the speed, when the car door is closed, the window is open, and the magnitude of noise inputted to the microphone is less than or equal to a threshold magnitude.

10 Claims, 5 Drawing Sheets

(52) U.S. Cl.
CPC . *B60W 2510/30* (2013.01); *G10K 2210/1282* (2013.01); *G10K 2210/3028* (2013.01)

(58) Field of Classification Search
CPC ....... G10K 11/17854; G10K 11/17881; G10K 2210/121; G10K 2210/128; G10K 2210/3211; B60W 40/105; B60W 2420/54; B60W 2510/30; H04R 2499/13
USPC .............................. 381/71.4, 71.11, 71.1, 86
See application file for complete search history.

(56) References Cited

FOREIGN PATENT DOCUMENTS

| | | |
|---|---|---|
| KR | 20140140829 | 12/2014 |
| KR | 20160030436 | 3/2016 |

\* cited by examiner

| Window open degree | Vehicle speed(Km/h) | Estimation auxiliary path transfer function |
|---|---|---|
| First level | 20 ~ 40 | S11(z) |
| First level | 40 ~ 60 | S12(z) |
| First level | 60 ~ 80 | S13(z) |
| Second level | 20 ~ 40 | S21(z) |
| Second level | 40 ~ 60 | S22(z) |
| Second level | 60 ~ 80 | S23(z) |

FIG. 6

| Window open degree | Vehicle speed(Km/h) | Output gain |
|---|---|---|
| First level | 20 ~ 40 | 1 |
| First level | 40 ~ 60 | 2 |
| First level | 60 ~ 80 | 3 |
| Second level | 20 ~ 40 | 1.5 |
| Second level | 40 ~ 60 | 2.5 |
| Second level | 60 ~ 80 | 3.5 |

APPARATUS FOR IMPROVING SOUND OF VEHICLE

CROSS-REFERENCE TO RELATED APPLICATIONS

This application is the National Stage filing under 35 U.S.C. 371 of International Application No. PCT/KR2019/015446, filed on Nov. 13, 2019 which claims the benefit of Korean Application No. 10-2018-0144100 filed on Nov. 21, 2018, the contents of which are all hereby incorporated by reference herein in their entirety.

TECHNICAL FIELD

The present disclosure relates to an apparatus for improving a sound of a vehicle, and more particularly, to improving sound output of a vehicle.

BACKGROUND ART

Noise caused by an internal combustion engine and an exhaust device is introduced into a vehicle interior, thereby causing a user to feel bothered in hearing.

A conventional manner to reduce noise transmitted to the vehicle interior is a manner to enhance the structural stiffness of a chassis. However, the weight of the vehicle is added due to the enhanced structured stiffness, thereby increasing fuel consumption and carbon dioxide emission.

To solve such a problem, an Engine Order Cancellation (EOC) technology has been introduced. The Engine Order Cancellation (EOC) technology is to remove engine noise introduced into the vehicle interior, in an internal combustion engine vehicle.

According to the EOC technology, in a situation, such as a window open, that a sound environment is largely changed during the driving of the vehicle, when wind having big energy is directly introduced into a microphone for the EOC within a short period of time, the divergence of an adaptive filter may be caused, such that an abnormal function of outputting an abnormal signal through a speaker may be performed.

In addition, according to an Engine Sound Sythesis (ESS) technology, when making an engine sound formed by outputting a wind sound introduced through the window open during the driving, there is required a function of properly adjusting an output gain for this.

In more detail, there is required a function of analyzing an extent that the wind sound is masked in unit of a specific frequency and compensating for this.

DISCLOSURE

Technical Problem

The present disclosure is to provide an apparatus for improving a sound, capable of performing an EOC function strong for a situation in which a sound environment of the vehicle is changed, based on data previously defined.

The present disclosure is to provide an apparatus for improving a sound, capable of blocking a situation in which an engine sound is not smoothly heard due to noise introduced as a window is open during the driving.

Technical Solution

According to an embodiment of the present disclosure, an apparatus for improving a sound may match a sound environment of a vehicle with an auxiliary path transfer function used in an EOC function, and may perform the EOC function by using the auxiliary path transfer function suitable for a current sound environment.

The applicable and additional scope of the present disclosure can be apparently understood from the following detailed description. However, various changes and modifications can be clearly understood by those skilled in the art while failing in the spirit and the scope of the present disclosure. Accordingly, the detailed description and a specific embodiment, such as an exemplary embodiment of the present disclosure, are provided only for the illustrative purpose.

Advantageous Effects

According to an embodiment of the present disclosure, the coefficient of the adaptive filter may be adjusted depending on a window open degree and a vehicle speed, thereby minimizing the degradation in performance of the EOC function.

In addition, according to an embodiment of the present disclosure, when the size of the noise input into the microphone exceeds the threshold size, the EOC function may be turned off, thereby preventing an abnormal signal from being output in advance due to the divergence of the adaptive filter.

DESCRIPTION OF DRAWINGS

FIG. 6 is a view illustrating the correspondence among a window open degree, a vehicle speed, and an output gain corresponding to the window open degree and the vehicle speed, according to an embodiment of the present disclosure.

BEST MODE

[Mode for Invention]

Figure 1:
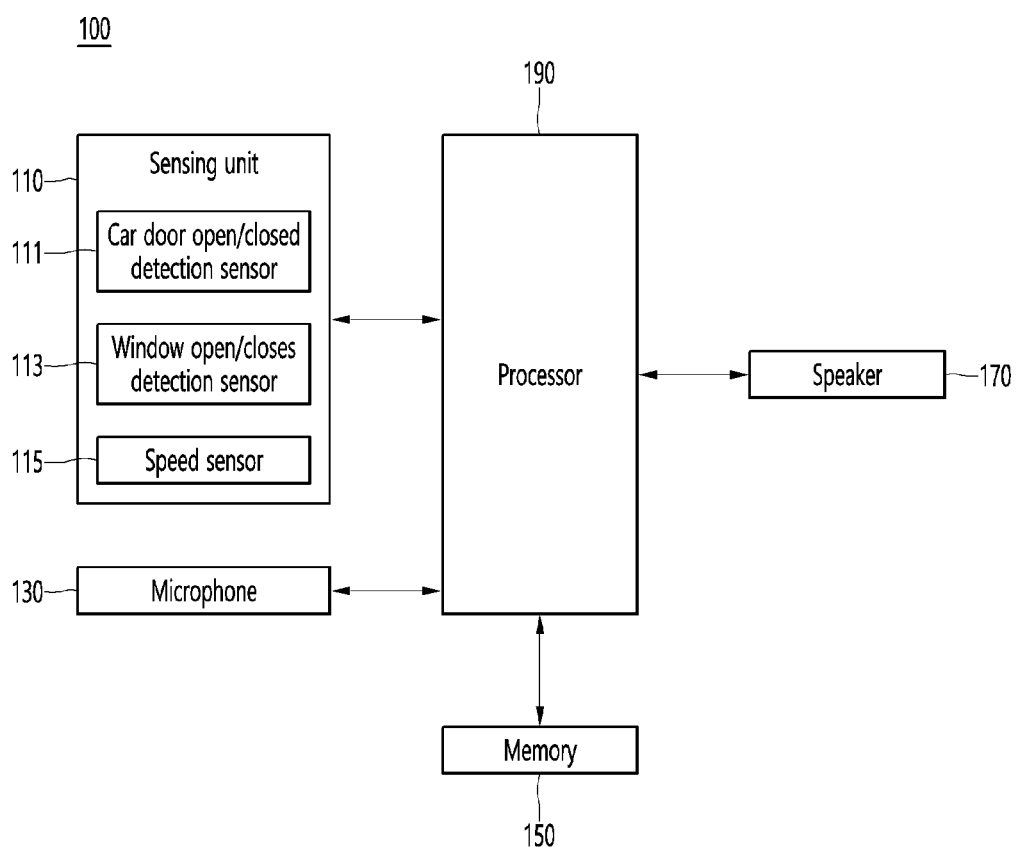
FIG. 1 is a block diagram illustrating components of an apparatus for improving a sound, according to an embodiment of the present disclosure.

Hereinafter, embodiments disclosed in the present disclosure will be described with reference to accompanying drawings, same or similar components will be assigned with same reference numerals, and the redundant repeat thereof will be omitted. Suffixes of components, such as "module" and "unit", which are employed in the following description, are merely intended to facilitate description of the specification, and the suffix itself is not intended to give any special meaning or function. In addition, in the following description of the present disclosure, a detailed description of well-known art or functions will be ruled out in order not to unnecessarily obscure the gist of the present disclosure. In addition, the accompanying drawings are provided to allow those skilled in the art to easily understand an embodiment of the present disclosure, and the technical spirit of the present disclosure is not limited thereto accompanying drawings. The present disclosure is to cover all modifications, equivalents, and alternatives falling within the spirit and scope of the present disclosure.

Although the terms including ordinal numbers, such as "first" and "second" may be used to describe various components, the components are not limited to the terms. These terms are used to distinguish one component from another component.

It will be understood that when a component is referred to as being coupled with/to" or "connected to" another component, the component may be directly coupled with/to or connected to the another component or an intervening component may be present therebetween. Meanwhile, it will be understood that when a component is referred to as being directly coupled with/to" or "connected to" another component, an intervening component may be absent therebetween.

The singular forms are intended to include the plural forms unless the context clearly indicates otherwise. In the disclosure, It will be further understood that the terms "comprises," "comprising," "includes," or "including," or "having" specify the presence of stated features, numbers, steps, operations, components, parts, or the combination thereof, but do not preclude the presence or addition of one or more other features, numbers, steps, operations, components, parts, and/or the combination thereof.

FIG. 1 is a block diagram illustrating components of an apparatus for improving a sound, according to an embodiment of the present disclosure.

An apparatus 100 for improving a sound illustrated in FIG. 1 may be included in a vehicle.

Referring to FIG. 1, the apparatus 100 for improving the sound may include a sensor unit 110, a microphone 130, a memory 150, a speaker 170, and a processor 190.

The sensing unit 110 may sense the status information of the vehicle.

The sensing unit 110 may include at least one of a car door open/closed detection sensor 111, a window open/closed detection sensor 113, and a speed sensor 115.

The car door open/closed detection sensor 111 may be disposed in a door of the vehicle to sense an open/closed status of the vehicle door.

The window open/closed detection sensor 113 may sense an open/closed status of a window.

The window open/closed detection sensor 113 may sense the window open degree. In more detail, the window open/closed detection sensor 113 may sense how much the window is open.

The window open/closed detection sensor 113 may sense the window open degree, by using a height, which is currently open, of the window with respect to the total height of the window.

The speed sensor 115 may measure a vehicle speed.

The microphone 130 may receive noise from the interior or the exterior of the vehicle.

The microphone 130 may include a plurality of microphones. The microphone 130 may be disposed around a driver seat of the vehicle.

The memory 150 may match an auxiliary path transfer function to the window open degree and the vehicle speed and may store the matching result.

The speaker 170 may output an audio signal. The speaker 170 may output a virtual engine sound.

The speaker 170 may be disposed near to an engine of the vehicle, which is provided only for the illustrative purpose.

The processor 190 may acquire vehicle door open/closed status information, window open/closed status information, and noise information input into the microphone 130.

The processor 190 may determine whether the vehicle door is open, based on the vehicle door open/closed status information.

The processor 190 may turn off an EOC function, when the vehicle door is determined as being open.

The processor 190 may determine whether the window is open, based on the window open/closed status information, when the vehicle door is not determined as being open.

The processor 190 may turn on the EOC function, when the window is not determined as being open.

The processor 190 may determine whether the size of the noise input into the microphone 130 is equal to or less than a threshold size, when the window is determined as being open.

The processor 190 may determine a auxiliary path transfer function, based on the window open degree and the vehicle speed, when the size of the noise into the microphone 130 is equal to or less than the threshold size.

The processor 190 may perform the EOC function, based on the determined auxiliary path transfer function.

The processor 190 may turn off the EOC function, when the size of the noise into the microphone 130 exceeds the threshold size.

The detailed functions of the processor 190 will be described later.

Figure 2:
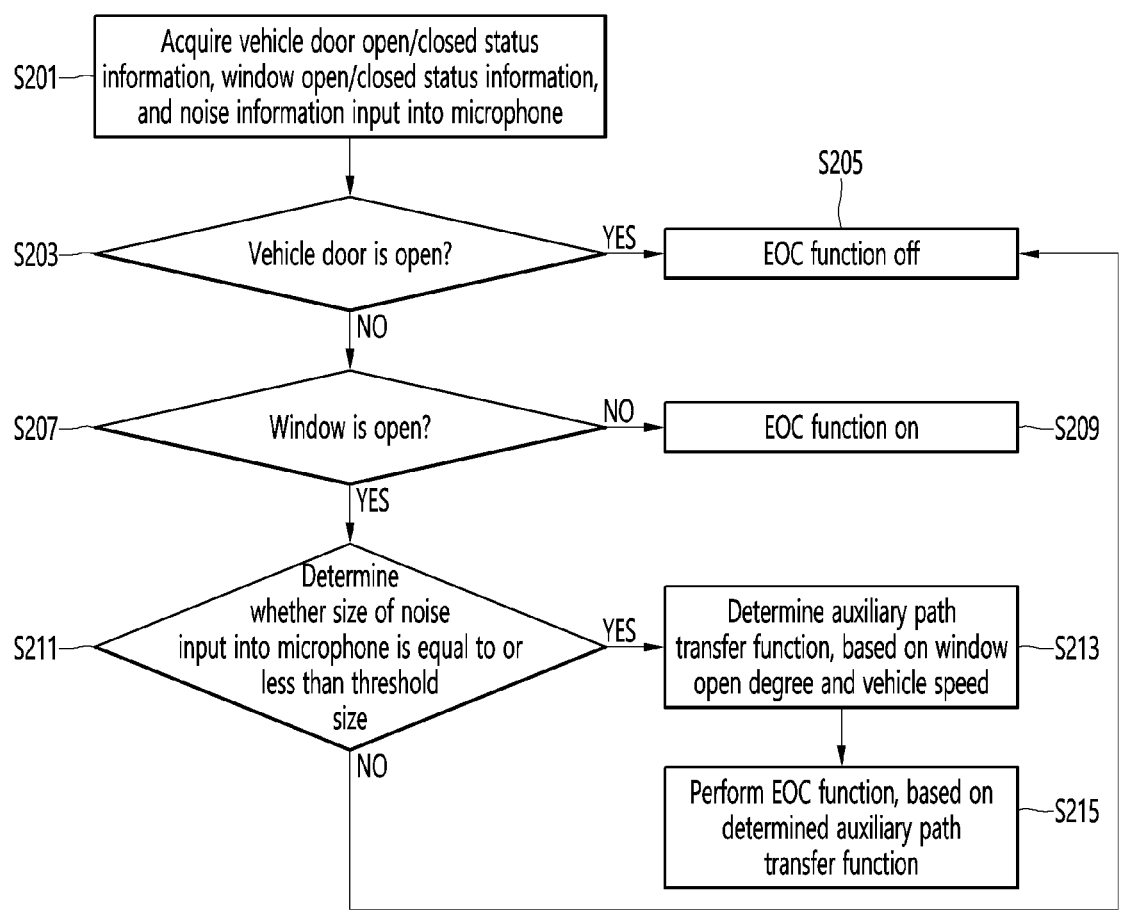
FIG. 2 is a flowchart illustrating an operating method of an apparatus for improving a sound, according to an embodiment of the present disclosure.

FIG. 2 is a flowchart illustrating an operating method of an apparatus for improving a sound, according to an embodiment of the present disclosure.

Referring to FIG. 2, the processor 190 of the apparatus 100 for improving the sound acquires the vehicle door open/closed status information, the window open/closed status information, and the noise information input into the microphone 130 of the vehicle (S201).

The processor 190 may sense the vehicle door open/closed status information indicating the open/closed status of the vehicle door through the car door open/closed detection sensor 111.

The car door open/closed detection sensor 111 is disposed in the vehicle door, to sense whether the vehicle door is open or closed.

The processor 190 may sense the window open/closed status information indicating the open/closed status information of the window through the window open/closed detection sensor 113.

According to still another embodiment, the processor 190 may measure a current driving speed of the vehicle, through the speed sensor 115.

The processor 190 determines whether the vehicle door is open, based on the vehicle door open/closed status information (S203).

The processor 190 may turn off the EOC function, when the vehicle door is determined as being open (S205).

The EOC function may be a function of removing engine noise, or noise, which is introduced into the interior of the vehicle, by using an adaptive filter.

The function of removing the engine noise may be a function of reducing an error signal, which is a summation result of the engine noise and the noise introduced into the vehicle, through an adaptive filter using a filtered-X Least Mean Square (LMS) algorithm.

The details of the filtered-X Least Mean Square (LMS) algorithm will be described later.

The processor 190 may turn off the EOC function, because the adaptive filter for performing the EOC function may be oscillated with a higher probability, due to the noise introduced into the exterior, when the vehicle door is determined as being open.

When the adaptive filter is oscillated, the EOC function may not be smoothly performed.

Meanwhile, the processor 190 determines whether the window is open, based on window open/closed status information, when the vehicle door is not determined as being open (S207).

The processor 190 turns on the EOC function, when the window is not determined as being open (S209)

The processor 190 may determine that the adaptive filter is able to perform a normal operation, and may activate the EOC function, when the vehicle door and the window are not open.

The processor 190 determines whether the size of the noise input into the microphone 130 is equal to or less than the threshold size, when the window is determined as being open (S211).

According to an embodiment, the threshold size may be a size for oscillating the adaptive filter for the EOC function.

The threshold size may be a preset size.

The processor 190 determines a secondary path transfer function, based on the window open degree and the vehicle speed, when the size of the noise input into the microphone 130 is equal to or less than the threshold size (S213).

According to an embodiment, the memory 150 may match an auxiliary path transfer function to the window open degree and the vehicle speed and may store the matching result.

The window open degree may indicate the degree that the window is open.

The window open degree may be divided into a plurality of levels. For example, when the window open degree includes two levels, a window open degree in a first level may be smaller than a window open degree in a second level.

The memory 150 may match a condition, in which the window open degree of the vehicle is in the first level, the size of the noise input into the microphone 130 is equal to or less than the threshold size, and the vehicle speed is in a first range, with a first auxiliary path transfer function, and may store the matching result.

For another example, the memory 150 may match a condition, in which the window open degree of the vehicle is in the second level, the size of the noise input into the microphone 130 is equal to or less than the threshold size, and the vehicle speed is in the first range, with a second auxiliary path transfer function, and may store the matching result.

For another example, the memory 150 may match a condition, in which the window open degree of the vehicle is in the first level, the size of the noise input into the microphone 130 is equal to or less than the threshold size, and the vehicle speed is in the second range, with a third auxiliary path transfer function, and may store the matching result.

For another example, the memory 150 may match a condition, in which the window open degree of the vehicle is in the second level, the size of the noise input into the microphone 130 inside the vehicle is equal to or less than the threshold size, and the vehicle speed is in the second range, with a fourth auxiliary path transfer function, and may store the matching result.

Each correspondence will be described in detail later.

The processor 190 may retrieve the auxiliary path transfer function, which corresponds to the size of the noise input into the microphone 130, the open/closed status of the window, and the vehicle speed, from the memory 150.

The processor 190 performs the EOC function, based on the determined auxiliary path transfer function (S215).

The procedure of performing the EOC function, based on the on the determined auxiliary path transfer function will be described later.

Figures 3, 4:
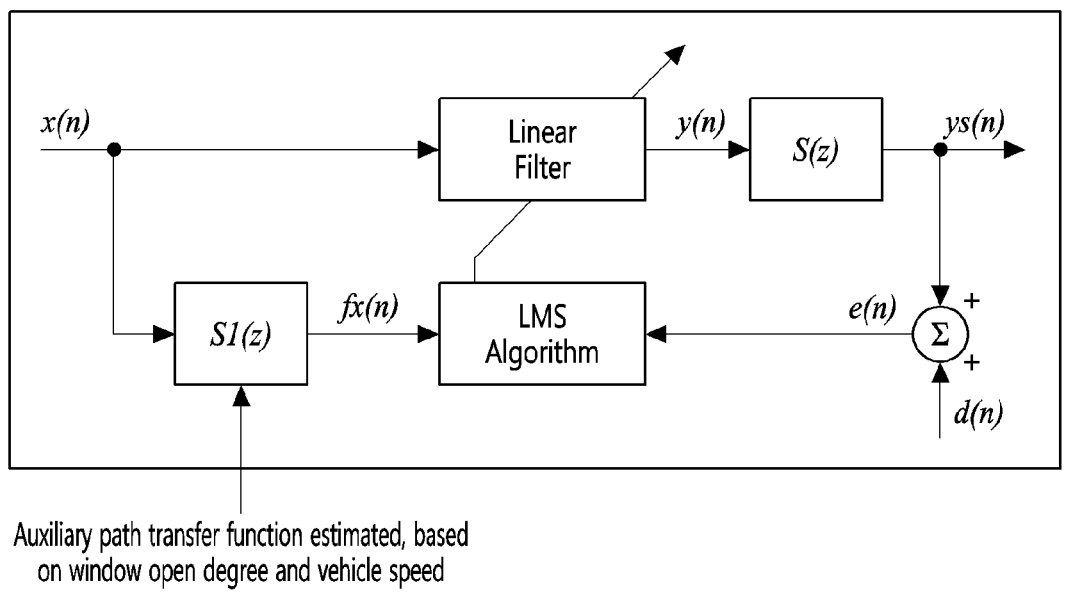
FIG. 3 is a view illustrating an adaptive filter for performing an EOC function, according to an embodiment of the present disclosure.
FIG. 4 is a view illustrating the correspondence among window open/closed status information, the vehicle speed, and an estimation auxiliary path transfer function corresponding to the window open/closed status information and the vehicle speed, according to an embodiment of the present disclosure.

FIG. 3 is a view illustrating an adaptive filter for performing an EOC function, according to an embodiment of the present disclosure.

In detail, FIG. 3 illustrates a diagram of a filtered-X Least Mean Square (LMS) adaptive filter 300 made using the filtered-X Least Mean Square (LMS) algorithm.

The adaptive filter made using the filtered-X Least Mean Square (LMS) algorithm is well-known technology, so the description thereof will be made at the minimum.

Referring to FIG. 3, '$x(n)$' is an input signal input to a linear filter at time '$n$'. The '$x(n)$', which is an engine noise signal cause by the engine, may be a reference signal.

'$d(n)$' may represent a noise signal sensed inside the vehicle. '$d(n)$' may be an output result made by applying a first path transfer function (not illustrated) to '$x(n)$'.

'$y(n)$' may be a first output signal which indicates the output of a filtering result for '$x(n)$' input to the linear filter.

'$S(z)$' may indicate a transfer function for an auxiliary path (or a secondary path).

'$ys(n)$' may be a second output signal which indicates a result obtained by applying the auxiliary path transfer function to the first output signal which is output from the linear filter.

'$e(n)$' may be an error signal obtained by superposing '$d(n)$' with '$ys(n)$'.

'$S1(z)$' may indicate an estimation auxiliary path transfer function estimated based on the window open/closed status and the vehicle speed.

The auxiliary path transfer function or the estimation auxiliary path transfer function may be expressed as an impulse response in the time domain.

'$fx(n)$' indicates a third output signal obtained by applying the estimation auxiliary path transfer function '$S1(z)$' to '$x(n)$'.

Input signals for the filtered-x adaptive filter are '$x(n)$' and '$e(n)$'. Conventional input signals for a typical adaptive filter are '$x(n)$' and '$d(n)$'.

According to the LMS algorithm, the coefficient of the adaptive filter may be repeatedly adjusted to minimize '$e(n)$' indicating the error signal.

The LMS algorithm is an algorithm having a goal to minimize the mean square of '$e(n)$'.

According to the filtered-x LMS algorithm, the coefficient of the adaptive filter may be updated through the following operations.

The first output signal '$y(n)$' output from the adaptive filter is calculated.

'$Fx(n)$' is generated, by using '$x(n)$' and the estimation auxiliary path transfer function '$S1(z)$', The coefficient of the adaptive filter is updated through following Equation 1.

$$w(n+1)=w(n)-m*e(n)*fx(n) \quad \text{[Equation 1]}$$

In the Equation, '$m$' denotes the step size of the adaptive filter, and '$w(n)$' is a filter coefficient vector corresponding to the filter coefficient.

The estimation auxiliary path transfer function may be a transfer function obtained by reflecting the window opening degree and the vehicle speed.

Meanwhile, the estimation auxiliary path transfer function corresponding to the window open degree and the vehicle speed may have correspondence as illustrated in the following drawings.

FIG. 4 is a view illustrating the correspondence among window open/closed status information, the vehicle speed, and an estimation auxiliary path transfer function corresponding to the window open/closed status information and the vehicle speed, according to an embodiment of the present disclosure.

Referring to FIG. 4, the correspondence of the estimation auxiliary pat transfer function, which is estimated depending on the window open/closed status information and the vehicle speed, stored in the memory 150, is illustrated.

The window open degree may include a first level and a second level, and a window open degree in the first level may be smaller than a window open degree in the second level.

Although FIG. 4 illustrates two levels by way of examples, more many levels may be employed.

Under a condition in which the window open degree is in the first level, and the vehicle speed is in the range of 20 to 40 Km/h, an estimation auxiliary path transfer function corresponding to the condition may be S11(z).

Under a condition in which the window open degree is in the first level, the vehicle speed is in the range of 40 to 60 Km/h, an estimation auxiliary path transfer function corresponding to the condition may be S12(z).

Under a condition in which the window open degree is in the first level, and the vehicle speed is in the range of 60 to 80 Km/h, an estimation auxiliary path transfer function corresponding to the condition may be S13(z).

Under a condition in which the window open degree is in the second level, and the vehicle speed is in the range of 20 to 40 Km/h, an estimation auxiliary path transfer function corresponding to the condition may be S21(z).

Under a condition in which the window open degree is in the second level, and the vehicle speed is in the range of 40 to 60 Km/h, an estimation auxiliary path transfer function corresponding to the condition may be S22(z).

Under a condition in which the window open degree is in the second level, and the vehicle speed is in the range of 60 to 80 Km/h, an estimation auxiliary path transfer function corresponding to the condition may be S23(z).

The processor 190 may determine an estimation auxiliary path transfer function estimated by using a current window open degree and a currently measured vehicle speed, based on the correspondence stored in the memory 150.

The processor 190 may perform the filtered-X LMS algorithm, by using the determined estimation auxiliary path transfer function.

In detail, the processor 190 may adjust the coefficient of the adaptive filter in real time, by using the determined estimation auxiliary path transfer function.

Meanwhile, in FIG. 4, the window open/closed status may be more sub-divided.

The window open status may be divided into a plurality of open levels.

In detail, a window open degree in a first open level may be smaller than a window open degree in a second open level. In addition, the window open degree in the second open level may be smaller than a window open degree in a third open level.

The memory 150 may store an estimation auxiliary path transfer function corresponding to the window open level and the vehicle speed.

The processor 190 may acquire the window open level and the vehicle speed, and may determine the estimation auxiliary path transfer function, which corresponds to the window open level and the vehicle speed, from the memory 150.

The processor 190 may adjust the filter coefficient of the adaptive filter, by using the determined estimation auxiliary path transfer function.

The following description will be made again with reference to FIG. 2.

Meanwhile, the processor 190 turns off the EOC function, when the size of the noise input into the microphone 130 exceeds the threshold size.

The processor 190 may determine that the adaptive filter for the EOC function may be oscillated with a higher probability and may deactivate the EOC function, when the size of the noise input into the microphone 130 exceeds the threshold size, as the window is open.

As described above, according to an embodiment of the present disclosure, the auxiliary path transfer function, which is previously defined, is properly selected depending on the window open/closed status and the vehicle speed, thereby minimizing the degradation in the EOC performance.

Figure 5:
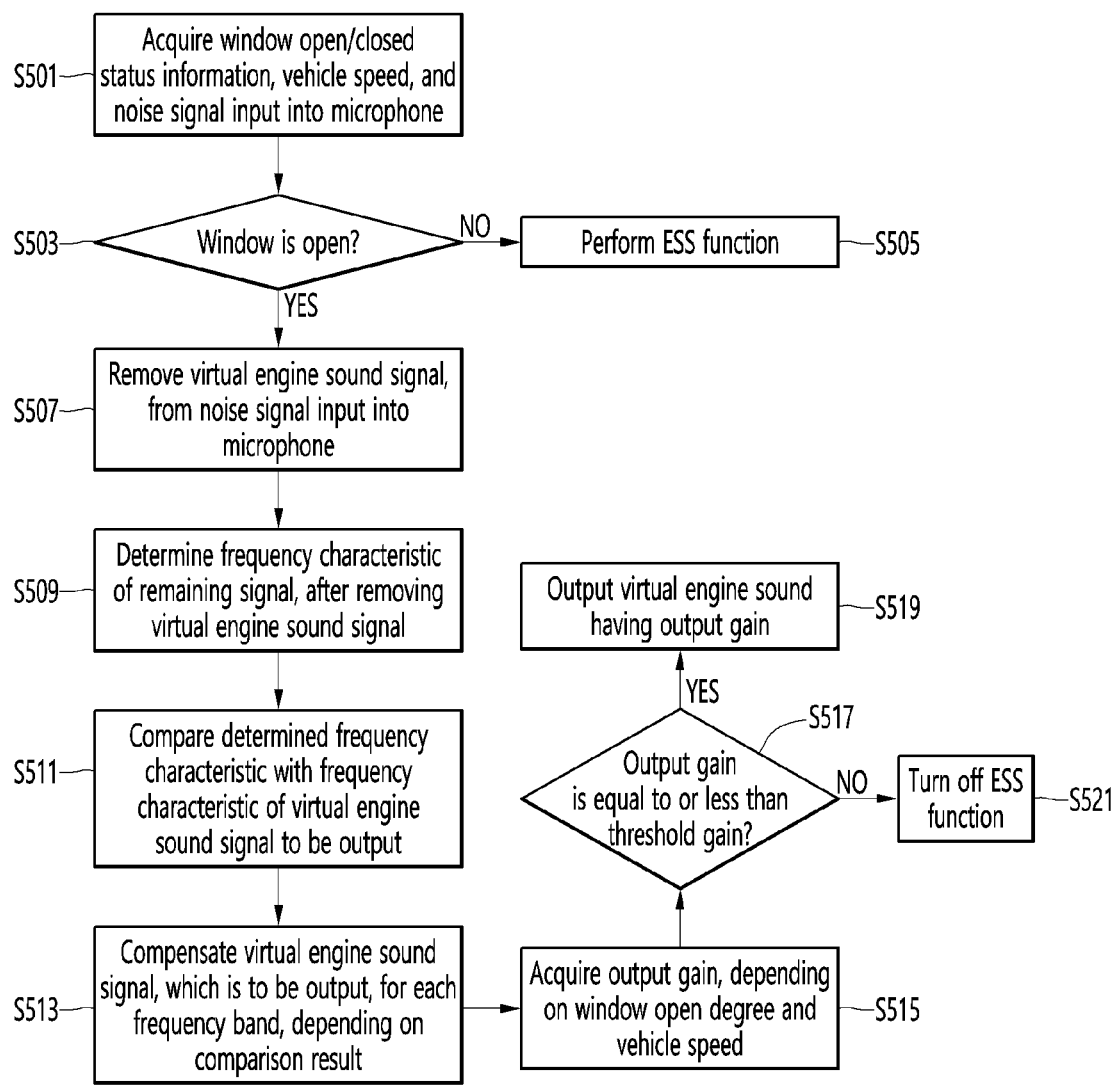
FIG. 5 is a flowchart illustrating an operating method of an apparatus for improving a sound, according to another embodiment of the present disclosure.

FIG. 5 is a flowchart illustrating an operating method of the apparatus 100 for improving the sound, according to another embodiment of the present disclosure.

In particular, in FIG. 5, an engine sound synthesis (ESS) technology of synthesizing and outputting a virtual engine sound, relates to adjusting an output gain of the virtual engine sound, when noise introduced as the window is open during the driving of the vehicle masks the virtual engine sound.

Referring to FIG. 5, the processor 190 may acquire window open/closed status information, a vehicle speed, and a noise signal input into the microphone 130 (S501).

The processor 190 determines whether the window is open, based on the window open/closed status information (S503).

The processor 190 performs an ESS function, when the window is not determined as being open (S505).

According to an embodiment, a function of synthesizing a virtual engine sound may be a function of synthesizing a virtual engine sound with noise generated from an existing engine and outputting the synthesizing result.

The processor 180 may output the virtual engine sound, in synchronization with an explosion stroke period of the engine.

When the window is not open, the processor 190 may output a virtual engine sound having a preset output gain through the speaker 170, in synchronization with a timing at which actual engine noise is generated.

The processor 190 removes a virtual engine sound signal from a noise signal input into the microphone 130, when the window is determined as being open (S507).

According to an embodiment, the processor 190 may extract the remaining signal, by removing the virtual engine sound signal from the noise signal input into the microphone 130, when the window is open.

The processor 190 may filter the virtual engine sound signal from the noise signal, because information on the virtual engine sound signal is previously known. The processor 190 may include a filter to remove the virtual engine sound signal.

The processor 190 determines a frequency characteristic of the remaining signal, after removing the virtual engine sound signal from the noise signal input into the microphone 130 (S509).

According to an embodiment, the frequency characteristic of the remaining signal may include a signal size for each frequency band.

The processor 190 compares the determined frequency characteristic of the remaining signal with the frequency characteristic of the virtual engine sound signal to be output (S511).

The processor 190 may compare a signal size of the remaining signal for each frequency band with a size of a virtual engine sound signal, which is to be output in a next period, for each frequency band.

The processor 190 compensates the output virtual engine sound signal for each frequency band, depending on a comparison result (S513).

The processor 190 may adjust the size of the virtual engine sound signal, which is to be output, based on the signal size of the remaining signal for each frequency band with the size of the virtual engine sound signal, which is to be output in a next period, for each frequency band.

For example, when the size of the remaining signal for a first frequency band is a first size, and when the size of the virtual engine sound signal, which is to be output, for the first frequency band is a second size less than the first size, the processor 190 may increase the size of the virtual engine sound signal, which is to be output, for the first frequency band by the difference between the second size and the first size.

The processor 190 acquires an output gain of the virtual engine sound signal corresponding to the window open degree, which is obtained, depending on the window open/closed status information, and the vehicle speed (S515).

Meanwhile, the processor 190 may determine an output gain, which corresponds to window open state information and the vehicle speed, such that a virtual engine sound is output, in match with vehicle status information.

The memory 150 may have a window open degree and an output gain corresponding to the vehicle speed.

FIG. 6 is a view illustrating the correspondence among a window open degree, a vehicle speed, and an output gain corresponding to the window open degree and the vehicle speed, according to an embodiment of the present disclosure.

Referring to FIG. 6, the window open degree may include a first level and a second level, and a window open degree in the first level may be smaller than a window open degree in the second level.

Although FIG. 6 illustrates two levels by way of examples, more many levels may be employed.

When the window open degree is in the first level, and when the vehicle speed is in the range of 20 to 40 Km/h, the output gain of the virtual engine sound may be '1'.

When the window open degree is in the first level, and when the vehicle speed is in the range of 40 to 60 Km/h, the output gain of the virtual engine sound may be '2'.

When the window open degree is in the first level, and when the vehicle speed is in the range of 60 to 80 Km/h, the output gain of the virtual engine sound may be '3'.

When the window open degree is in the second level, and when the vehicle speed is in the range of 20 to 40 Km/h, the output gain of the virtual engine sound may be '1.5'.

When the window open degree is in the second level, and when the vehicle speed is in the range of 40 to 60 Km/h, the output gain of the virtual engine sound may be '2.5'.

When the window open degree is in the second level, and when the vehicle speed is in the range of 60 to 80 Km/h, the output gain of the virtual engine sound may be '3.5'.

The processor 190 may determine an output gain of a virtual engine sound from the memory 150, based on the window open degree and the vehicle speed.

The processor 190 may output the virtual engine sound having the determined output gain, through the speaker 170.

The following description will be made again with reference to FIG. 5.

The processor 190 may determine whether the acquired output gain is equal to or less than a threshold gain, and may output the virtual engine sound having the determined output gain, through the speaker 170, when the output gain is equal to or less than the threshold gain (S519).

According to an embodiment, the threshold gain may be a gain corresponding to the extent of causing a problem in hearing of a driver, and may be preset.

The processor 190 turns off the ESS function, when the acquired output gain exceeds the threshold gain (S521).

In other words, when the determined output gain exceeds the threshold gain, and when the virtual engine sound having the relevant output gain is output, the problem may be caused in hearing of the driver. To prevent this, the processor 190 may deactivate the ESS function, when the determined output gain exceeds the threshold gain.

As described above, according to an embodiment described with reference to FIGS. 5 and 6, when the sound of the wind, which is introduced through the window open during the driving of the vehicle, is masked, the output gain of the virtual engine sound may be adjusted, such that the driver may exactly detect the operating status of the vehicle.

The above-described invention is able to be implemented with computer-readable codes on a medium having a program. Computer-readable medium includes all types of recording devices having data which is readable by a computer system. For example, the computer-readable medium includes a hard disk drive (HDD), a solid state disk (SSD), a silicon disk drive (SDD), a ROM, a RAM, a CD-ROM, a magnetic tape, a floppy disk, or an optical data storage device.

Accordingly, the detailed description should be understood by way of example instead of being limitedly interpreted in terms of all aspects. The scope of the present disclosure should be determined by the reasonable interpretation of attached claims, and the equivalents of the present disclosure falls within the scope of the present disclosure.

The invention claimed is:

1. An apparatus comprising:
    a first sensor configured to determine whether a window of a vehicle is open or closed;
    a second sensor configured to determine whether a door of the vehicle is open or closed;
    a third sensor configured to determine a speed of the vehicle;
    a microphone configured to detect sounds of the vehicle;
    a memory; and
    a processor configured to adjust a coefficient of an adaptive filter used in a function based at least in part on a determination that the window of the vehicle is open, the door of the vehicle is closed, and a volume of the sounds of the vehicle into the microphone is less than or equal to a threshold size, wherein the coefficient of the adaptive filter is adjusted based at least in part on a degree that the window of the vehicle is open and the speed of the vehicle.

2. The apparatus of claim 1, Wherein the processor is further configured to:
perform the function by using a filtered-X Least Mean Square (LMS) algorithm, and
determine an estimation auxiliary path transfer function of the filtered-X LMS algorithm based at least in part on the degree that the window of the vehicle is open and the speed of the vehicle, wherein the coefficient of the adaptive filter is further adjusted by using the determined estimation auxiliary path transfer function.

3. The apparatus of claim 2, wherein the memory stores correlations between the degree that the window of the vehicle is open, the speed of the vehicle, and the determined estimation auxiliary path transfer function corresponding to the degree that the window of the vehicle is open and the speed of the vehicle.

4. The apparatus of claim 3, wherein the processor is further configured to retrieve the determined estimation auxiliary path transfer function from the memory.

5. The apparatus of claim 4, wherein the processor is further configured to:
determine a first estimation auxiliary path transfer function to an auxiliary path transfer function corresponding to the degree that the window of the vehicle is open past a first level and the speed of the vehicle in a first speed range, and
determine a second estimation auxiliary path transfer function to the auxiliary path transfer function corresponding to the degree that the window of the vehicle is open past a. second level and the speed of the vehicle in the first speed range.

6. A method for operating a sound improving apparatus for improving a sound of a vehicle, the method comprising:
determining whether a window of the vehicle is open or closed and whether a door of the vehicle is open or closed;
detect sounds of the Vehicle from a microphone;
determine a speed of the vehicle; and
adjusting a coefficient of an adaptive filter used in a function based at least in part on a determination that the window of the vehicle is open, the door of the vehicle is closed, and a volume of the sounds of the vehicle into the microphone is less than or equal to a threshold size, wherein the coefficient of the adaptive filter is adjusted based at least in part on a degree that the window of the vehicle is open and the speed of the vehicle.

7. The method of claim 6, further comprising:
performing the function by using a filtered-X Least Mean Square (LMS) algorithm, and
determining an estimation auxiliary path transfer function of the filtered-X LMS algorithm based at least in part on the degree that the window of the vehicle is open and the speed of the vehicle, wherein the coefficient of the adaptive filter is further adjusted by using the determined estimation auxiliary path transfer function.

8. The method of claim 7, further comprising:
storing correlations between the degree that the window of the vehicle is open, the speed of the vehicle, and the determined estimation auxiliary path transfer function corresponding to the degree that the window of the vehicle is open and the speed of the vehicle.

9. The method of claim 8, further comprising:
retrieving the determined estimation auxiliary path transfer function from a memory.

10. The method of claim 9, wherein the retrieving of the estimation auxiliary path transfer function includes:
determining a first estimation auxiliary path transfer function to an auxiliary path transfer function corresponding to the degree that the window of the vehicle is open past a first level and the speed of the vehicle in a first speed range, and
determining a second estimation auxiliary path transfer function to the auxiliary path transfer function corresponding to the degree that the window of the vehicle is open past a second level and the speed of the vehicle in the first speed range.

* * * * *